United States Patent
Wang et al.

(10) Patent No.: US 12,167,014 B2
(45) Date of Patent: Dec. 10, 2024

(54) TECHNOLOGY TO USE VIDEO SOURCE CONTEXT INFORMATION IN POST-PROCESSING OPERATIONS

(71) Applicant: INTEL CORPORATION, Santa Clara, CA (US)

(72) Inventors: Changliang Wang, Bellevue, WA (US); Mohammad R. Haghighat, San Jose, CA (US); Wei Hu, Shanghai (CN); Tao Xu, Shanghai (CN); Tianmi Chen, Shanghai (CN); Bin Yang, Shanghai (CN); Jia Bao, Shanghai (CN); Raul Diaz, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/996,997

(22) PCT Filed: May 22, 2020

(86) PCT No.: PCT/CN2020/091715
§ 371 (c)(1),
(2) Date: Oct. 24, 2022

(87) PCT Pub. No.: WO2021/232392
PCT Pub. Date: Nov. 25, 2021

(65) Prior Publication Data
US 2023/0171420 A1    Jun. 1, 2023

(51) Int. Cl.
*H04N 7/12* (2006.01)
*H04N 19/172* (2014.01)
(Continued)

(52) U.S. Cl.
CPC ........... *H04N 19/46* (2014.11); *H04N 19/172* (2014.11); *H04N 19/85* (2014.11)

(58) Field of Classification Search
CPC ...... H04N 19/46; H04N 19/172; H04N 19/85; H04N 19/117; H04N 19/44; H04N 19/102; H04N 19/17; H04N 19/70
See application file for complete search history.

(56) References Cited

U.S. PATENT DOCUMENTS

| | | | |
|---|---|---|---|
| 2008/0152245 A1 | 6/2008 | El-Maleh et al. | |
| 2012/0213409 A1* | 8/2012 | El-Maleh ............... | H04N 19/48 382/103 |

(Continued)

FOREIGN PATENT DOCUMENTS

| | | |
|---|---|---|
| CN | 109257600 A | 1/2019 |
| WO | 2015034792 A1 | 3/2015 |
| WO | 2017167576 A | 10/2017 |

OTHER PUBLICATIONS

International Search Report and Written Opinion for Application No. PCT/CN2020/091715, mailed Feb. 18, 2021, 9 pages.

*Primary Examiner* — Gims S Philippe

(74) *Attorney, Agent, or Firm* — Jordan IP Law, LLC

(57) ABSTRACT

Systems, apparatuses and methods may provide for source device technology that identifies a plurality of object regions in a video frame, automatically generates context information for the video frame on a per-object region basis and embeds the context information in a signal containing the video frame. Additionally, playback device technology may decode a signal containing a video frame and embedded context information, identifies a plurality of object regions in the video frame based on the embedded context information, and automatically selects one or more post-processing configurations for the video frame on a per-object region basis.

25 Claims, 10 Drawing Sheets

(51) Int. Cl.
  *H04N 19/46*    (2014.01)
  *H04N 19/85*    (2014.01)

(56)           References Cited

U.S. PATENT DOCUMENTS

2016/0094859 A1    3/2016  Tourapis et al.
2018/0270287 A1*   9/2018  Ouedraogo .......... H04N 19/103
2019/0139403 A1*   5/2019  Alam .................... G08G 1/0112
2019/0289208 A1    9/2019  Adsumilli et al.
2021/0019620 A1*   1/2021  Munoz Delgado ....... G06T 7/11
2021/0191971 A1*   6/2021  Ko ...................... G06F 16/5854

* cited by examiner

TECHNOLOGY TO USE VIDEO SOURCE CONTEXT INFORMATION IN POST-PROCESSING OPERATIONS

CROSS REFERENCE TO RELATED APPLICATIONS

The present application is a U.S. National Phase Patent Application, which claims the benefit of priority to International Patent Application No. PCT/CN2020/091715 filed on May 22, 2020.

TECHNICAL FIELD

Embodiments generally relate to video post-processing. More particularly, embodiments relate to technology that uses video source context information in post-processing operations.

BACKGROUND

Ultra-high-resolution video (e.g., 4K UHD/Ultra High Definition, 8K UHD) may be delivered to remote users in media viewing, online gaming, virtual reality (VR) and other settings. While video compression generally reduces the bandwidth requirements of a video stream prior to transmission, there remains considerable room for improvement. For example, compression standards such as HEVC (High Efficiency Video Coding, e.g., H.265) and VP9 may achieve better coding efficiency at the cost of higher computational complexity. Moreover, each stage of the video pipeline typically introduces various types of noise and/or quality losses, which may be addressed via video post-processing (VPP) just prior to display of the video. In such a case, the high computational complexity associated with decompressing the video may make VPP more difficult, particularly if the viewing platform is a client device (e.g., laptop, tablet, smart phone) with limited computational resources and/or battery life.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
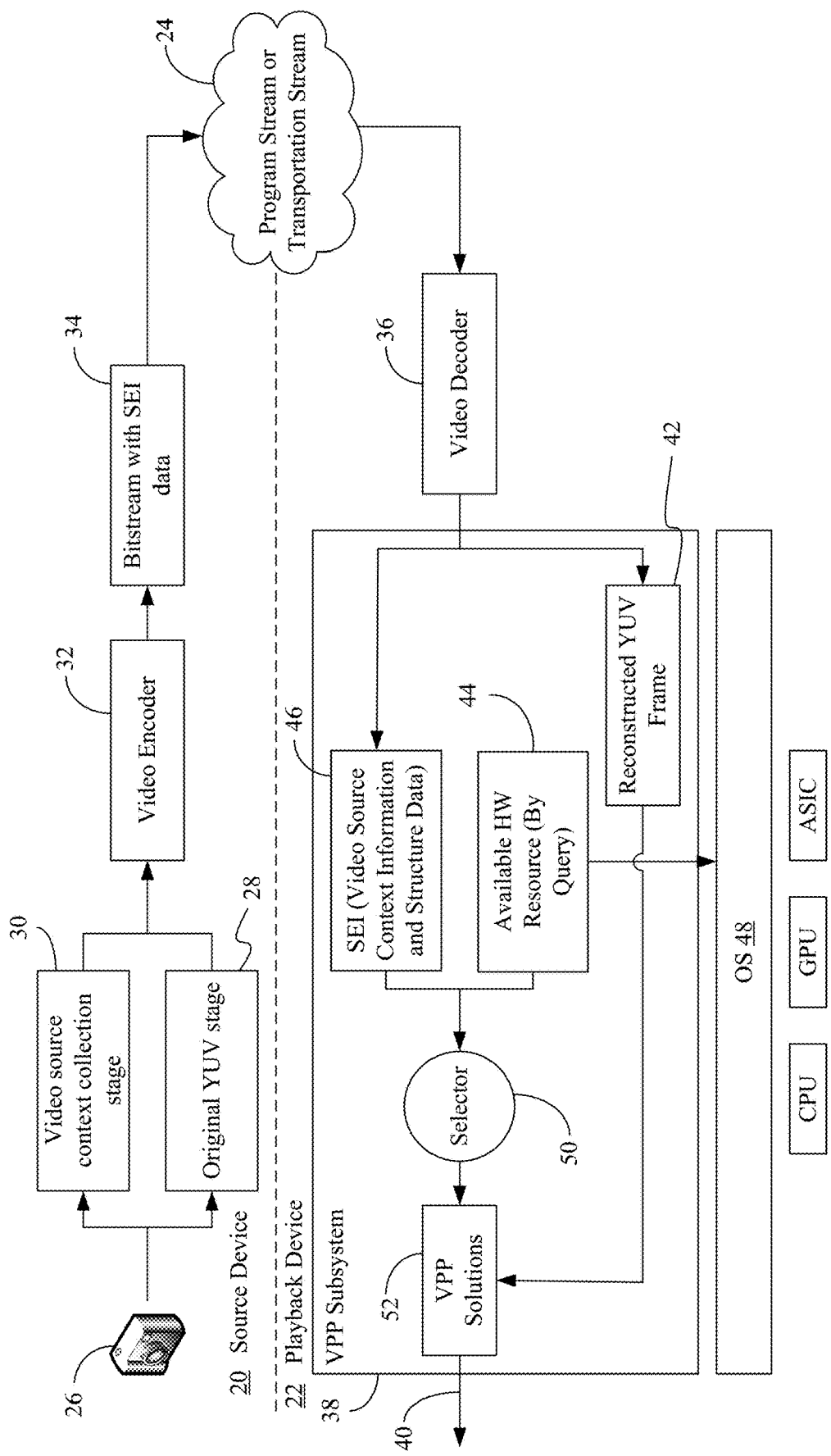
FIG. 1 is a block diagram of an example of a video pipeline according to an embodiment.

Turning now to FIG. 1, a video pipeline is shown in which a source device 20 obtains video content (e.g., ultra-high-resolution video) and delivers the video content to a remote playback device 22 (e.g., laptop, tablet, smart phone or other client device having limited computational resources) via a stream (e.g., program stream, transportation stream) delivery infrastructure 24. The video content, which may be obtained from a video capture component 26 and/or a graphics rendering component (e.g., graphics pipeline and/or card, not shown), may generally include a sequence of video frames associated with media (e.g., television and/or movie content), online gaming (e.g., multi-player game scenes), VR, augmented reality (AR), etc., or any combination thereof. In the illustrated example, the source device 20 includes an original YUV (luma, color difference of blue minus luma, color difference of red minus luma) stage 28 (e.g., sequence, phase) that determines the color space for the video frames.

In an embodiment, the source device 20 also includes a video source context collection stage 30. As will discussed in greater detail below, the context information collected by the stage 30 may include object region identifiers (IDs, e.g., object bounding boxes and/or coordinates), which specify where objects (e.g., players, balls, etc.) are located in the video frames. Thus, the source content collection stage 30 might include automated object detection (e.g., computer vision/CV) and/or recognition technology to generate the object region IDs. In one example, the context information also includes focus information, depth information, motion vector information, etc., on a per-object region basis. For example, the context information might indicate that a first object (e.g., player) in a video frame is in focus, located at a low depth (e.g., relatively close to the viewer/user), and moving fairly quickly. The context information may also indicate that a second object (e.g., ball) in the video frame is out of focus, located at a low depth, and moving very quickly.

The illustrated source device 20 includes a video encoder 32, which encodes the color space information from the original YUV stage 28 and the source context information from the collection stage 30 into a bitstream 34 (e.g., signal). The color space information and source context information may be embedded in the bitstream 34 as a supplemental enhancement information (SEI) message or other suitable data structure. In one example, the video encoder 32 uses a compression standard such as, for example, AVC (Advanced Video Coding, e.g., H.264), HEVC and/or VP9 to achieve a relatively high coding efficiency. Thus, to enable SEI encoding for AVC, the video encoder 32 might set the network abstraction layer (NAL) type to a value of six. To enable SEI encoding for HEVC, the video encoder 32 may set the NAL type to a value of thirty-nine when encoding a prefix message (e.g., PREFIX_SEI) and set the NAL type to a value of forty when encoding a suffix message (e.g., SUFFIX_SEI).

The playback device 22 may include a video decoder 36 to decode the bitstream 34 upon receipt of the bitstream 34 from the stream delivery infrastructure 24. In one example, the video decoder 36 uses a compression standard such as, for example, AVC, HEVC and/or VP9 to achieve a relatively high coding efficiency. Video pipeline components, however, such as the video encoder 32, the stream delivery infrastructure 24 and/or the video decoder 36 may introduce various types of noise (e.g., visual noise, audible noise) and/or quality losses (e.g., visual artifacts, audible artifacts) into the decoded signal. Accordingly, the illustrated playback device 22 includes a VPP subsystem 38 to reduce visual noise in an output 40 of the playback device 22, reduce audible noise in the output 40, remove compression artifacts from the output 40, enhance contrast in the output 40, enhance sharpness in the output 40, scale (e.g., modify the resolution of) the output 40, etc., or any combination thereof. As will be discussed in greater detail, the VPP subsystem 38 uses the source context information embedded in the bitstream 34 to improve performance and/or extend battery life.

More particularly, the illustrated VPP subsystem 38 includes a color space reconstruction stage 42, a resource query stage 44, and a context extraction stage 46. In an embodiment, the resource query stage 44 sends real-time queries to an operating system (OS) 48 to determine the availability of computational resources such as, for example, a central processing unit (CPU, e.g., host processor), graphics processing unit (GPU, e.g., graphics processor), an application specific integrated circuit (ASIC), and so forth. As will be discussed in greater detail, the responses to the real-time queries may be used to determine and/or set one or more cost constraints for the VPP subsystem 38. The illustrated context extraction stage 46 identifies the object regions in the video frames as well as the other context information (e.g., focus information, depth information, motion vector information) associated with each object region.

In an embodiment, a selector 50 uses the source context information from the extraction stage 46 and the cost constraint(s) from the query stage 44 to automatically select one or more post-processing configurations 52 (e.g., solutions, algorithms, etc.) for each video frame on a per-object region basis. In the illustrated example, the selected post-processing configuration(s) 52 are applied to the YUV frames 42 from the reconstruction stage 42 to obtain the output 40. Thus, the performance of the playback device 22 may be significantly enhanced by ensuring that each object region in the video frame is post-processed using a configuration 52 that is best tailored to the object region in question. Indeed, real-time super resolution post processing (e.g., artificial intelligence/AI-based) may be achieved using the illustrated solution.

For example, if the cost constraint indicates that hardware resources are currently limited or power consumption is high (e.g., on a battery-powered platform), an object region that is out of focus, far away from the viewer and/or static, might be processed with a post-processing configuration 52 that has a relatively low computational overhead. By contrast, if the cost constraint indicates that hardware resources are not currently limited or power consumption is low, the object region that is out of focus, far away from the viewer and/or static, might be processed with a post-processing configuration 52 that has a slightly higher computational overhead (e.g., improving the image quality in that object region).

Figure 2:
FIG. 2 is an illustration of an example of a video frame and a plurality of object regions in the video frame according to an embodiment.
Figure 2:
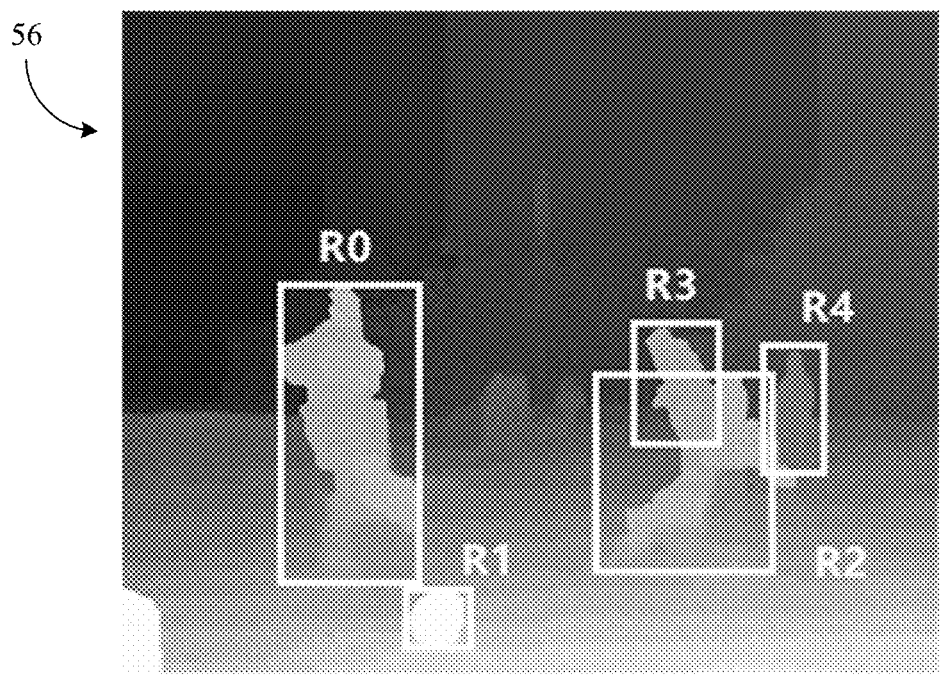

FIG. 2 shows a video frame 54 (e.g., depicting a soccer game scene) and a plurality of object regions 56 identified in the video frame 54. In the illustrated example, a camera provides context information and merges the context information into object region-based arrays:

$R_i\{x_0, y_0, x_1, y_1, mv\_x, mv\_y, depth, focus\}$, where $x_0, y_0, x_1, y_1$: region coordinate $mv\_x, mv\_y$: avg motion vector x directional and y $mv\_x$, $mv\_y$ directional in this region $\in [0\text{-}32]$ Depth: the average depth in this region based on depth $\in [0\text{-}1]$ depth map focus: if this region belongs to camera focus focus $\in \{0, 1\}$ The number ranges provided above are to facilitate discussion only and may vary depending on the circumstances. In the illustrated example of a soccer game scene, four human body regions are identified during capturing, and one ball region is identified by either an auto-tracking feature from the camera or depth map segmentation. The context information for the object regions is structured as:

| | |
|---|---|
| $R_0\{x_{00}, y_{00}, x_{01}, y_{01}, 16, 2, 0.2, 1\}$ | Focused object, low depth, fairly fast motion |
| $R_1\{x_{10}, y_{10}, x_{11}, y_{11}, 32, 1, 0.1, 0\}$ | Not focused, low depth, very fast motion, |
| $R_2\{x_{20}, y_{20}, x_{21}, y_{21}, 16, 4, 0.3, 0\}$ | Not focused, fairly low depth, medium motion |
| $R_3\{x_{20}, y_{20}, x_{21}, y_{21}, 16, 4, 0.4, 0\}$ | Not focused, fairly low depth, medium motion |
| $R_4\{x_{30}, y_{30}, x_{31}, y_{31}, 0, 0, 0.8, 0\}$ | Not focused, high depth, static |
| $R_5\{-1, -1, -1, -1, 0, 0, 1, 0\}$ | Background, not encoded and transferred |

There may always be an implied background region, which represents the remainder of the video frame 54 and is neither encoded nor transferred to the playback device. Finally, the structured data may be embedded as an SEI message according to the appropriate payload syntax.

Figure 3:
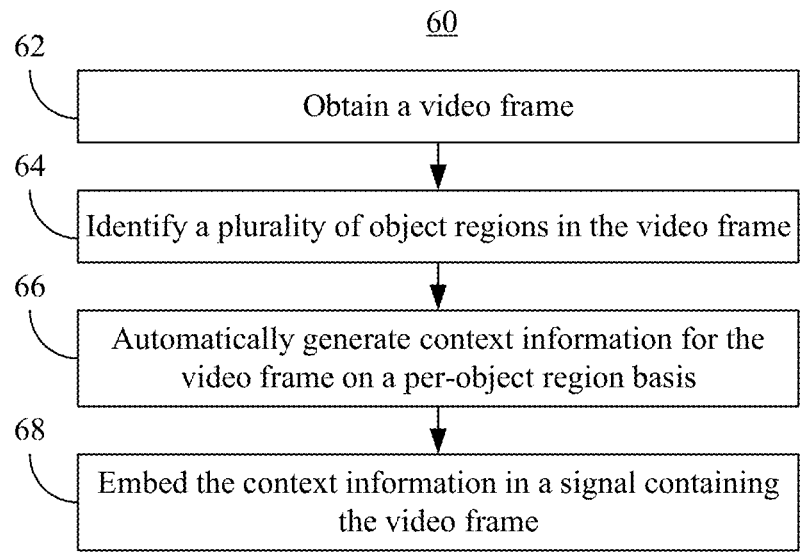
FIG. 3 is a flowchart of an example of a method of operating a source device according to an embodiment.

FIG. 3 shows a method 60 of operating a source device. The method 60 may generally be implemented by a source device such as, for example, the source device 20 (FIG. 1), already discussed. More particularly, the method 60 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality hardware logic using circuit technology such as, for example, ASIC, complementary metal oxide semiconductor (CMOS) or transistor-transistor logic (TTL) technology, or any combination thereof.

For example, computer program code to carry out operations shown in the method 60 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 62 provides for obtaining a video frame. In an embodiment, block 62 obtains the video frame from a video capture component (e.g., camera) and/or a graphics rendering component (e.g., graphics pipeline). Block 64 may identify a plurality of object regions in the video frame. In one example, block 64 includes the use of object detection, tracking and/or recognition technology (e.g., computer vision) to identify the object regions. Illustrated block 66 automatically generates context information for the video frame on a per-object region basis. As already noted, the context information may include focus information, depth information, motion vector information, etc., or any combination thereof, on the per-object region basis. In an embodiment, block 68 embeds the context information in a signal (e.g., bitstream) containing the video frame. As already noted, the context information may be embedded in the signal as an SEI message. In one embodiment, no overhead bits are introduced during video encoding. For example, compared to the typical bitrate that a 4K video stream consumes (e.g., 30 Mbps-60 Mbps), the embedded context information consumes at most several kilobytes per seconds, which is negligible overhead to the bitstream. Structuring the context information on the per-object region basis enables to illustrated method 60 to enhance performance through greater flexibility and efficiency in the source device.

Figure 4:
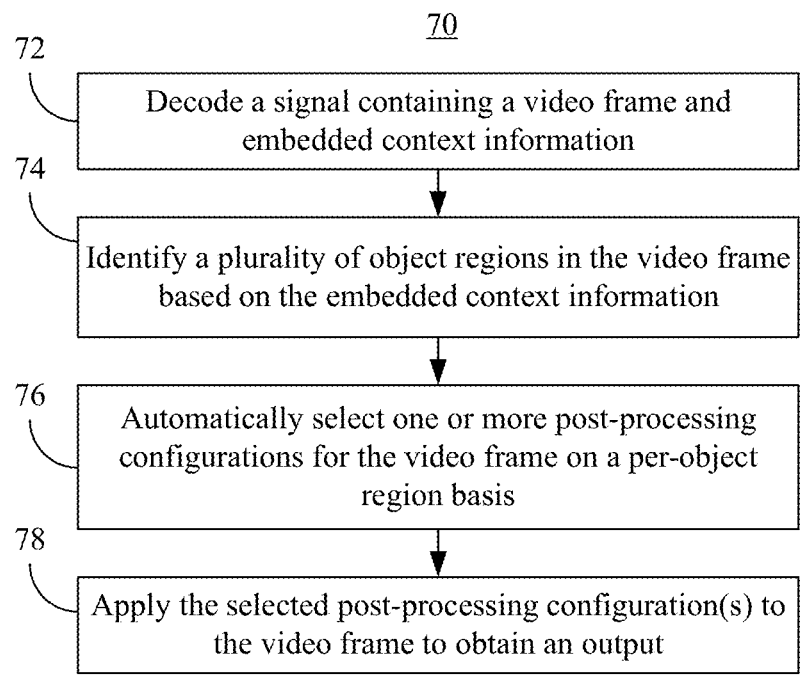
FIG. 4 is a flowchart of an example of a method of operating a playback device according to an embodiment.

FIG. 4 shows a method 70 of operating a playback device. The method 70 may generally be implemented in a playback device such as, for example, the playback device 22 (FIG. 1), already discussed. More particularly, the method 70 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 72 provides for decoding a signal containing a video frame and embedded context information (e.g., object region IDs, focus information, depth information, motion vector information, etc.). A plurality of object regions may be identified in the video frame at block 74 based on the embedded context information. In an embodiment, block 76 automatically selects one or more post-processing configurations for the video frame on a per-object region basis. For example, block 76 might automatically select a first post-processing configuration for a first object region in a video frame, automatically select a second post-processing configuration for a second object region in the video frame, and automatically select a third post-processing configuration for a third object region in the video frame, where the first, second, and third post-processing configurations are different from one another. As will be discussed in greater detail, selecting the post-processing configuration(s) may include selecting between one or more neural network configurations, one or more video enhancement processes, and so forth.

Block 78 applies the selected post-processing configuration(s) to the video frame to obtain an output. In one example, the automatically selected post-processing configuration(s) one or more of reduce visual noise in the output, reduce audible noise in the output, remove compression artifacts from the output, enhance contrast in the output, enhance sharpness in the output or scale the output. The illustrated method 70 enhances performance through the automated selection of VPP configurations on a per-object region basis. For example, each object region may be assigned a VPP configuration that is tailored to the object region in question. Such an approach improves flexibility, reduces power consumption, and increases efficiency in the playback device.

Figure 5:
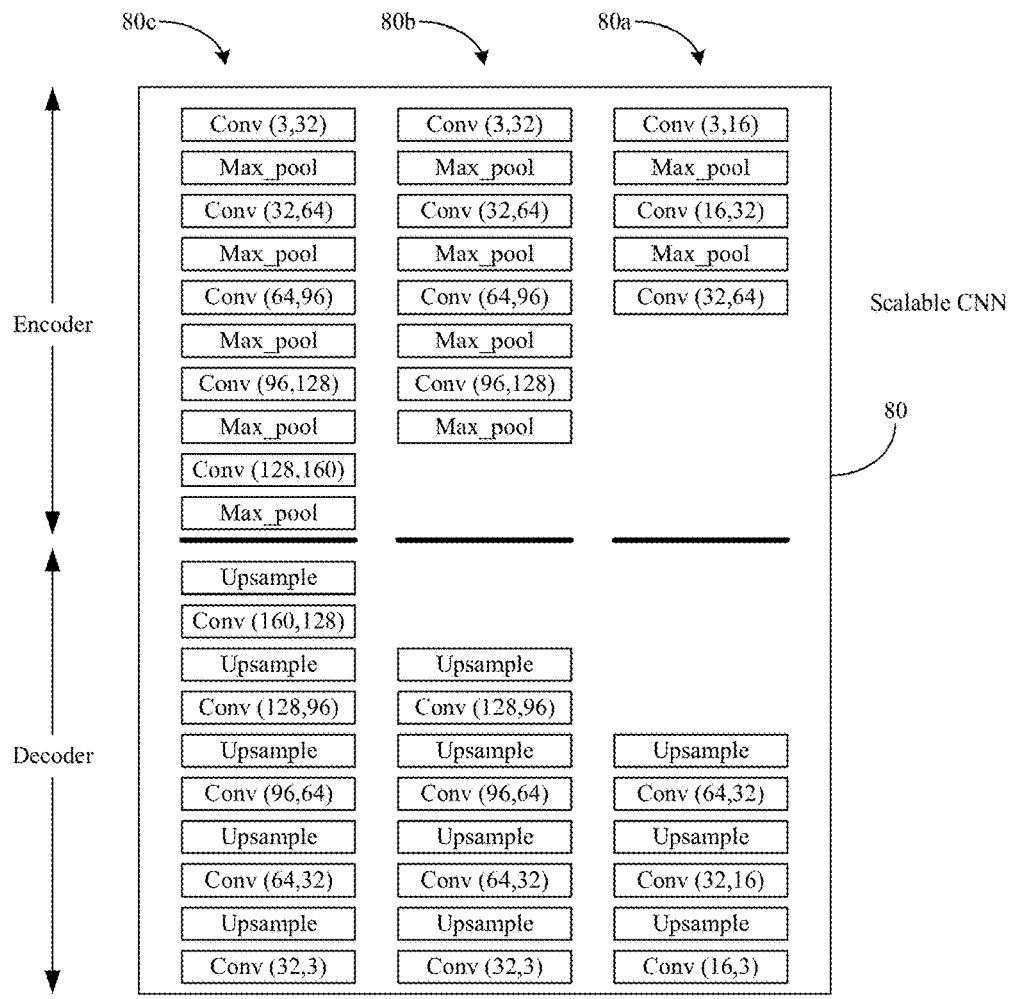
FIG. 5 is an illustration of an example of a plurality of neural network configurations according to an embodiment.

FIG. 5 shows a scalable plurality of neural network configurations 80 (80a-80c). In the illustrated example, a first network configuration 80a includes six layers (e.g., representing relatively low quality and computational complexity) on the decoder side, a second network configuration 80b includes eight layers (e.g., representing intermediate quality and computational complexity), and a third network configuration 80c includes ten layers (e.g., representing relatively high quality and computational complexity). Other post-processing configurations such as different image filter strengths, training weights, training bias parameters and/or video enhancement processes may also be used. As already noted, the neural network configurations 80 may be selected on a per-object region basis, where the selection takes into consideration source context information and the availability of computational resources.

Figure 6:
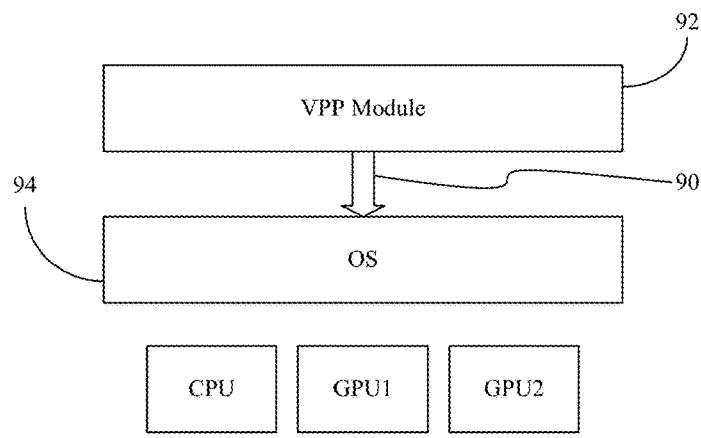
FIG. 6 is a block diagram of an example of a real-time query for available computational resources according to an embodiment.

Turning now to FIG. 6, the issuance of a real-time query 90 (e.g., on a predefined interval) from a VPP module 92 (e.g., engine including logic instructions, configurable logic, fixed-functionality hardware logic, etc., or any combination thereof) to an OS 94 is shown. In one example, the OS 94 determines the availability of a CPU, a first GPU ("GPU1"), and a second GPU ("GPU2"), and issues a response to the query 90. The OS 94 might call one or more related system APIs (application programming interfaces) and determine hardware (e.g., CPU, GPU, memory) utilization levels in response to the query 90. In an embodiment, the VPP module 92 determines a cost constraint based on the response(s) from the OS 94, where the cost constraint is used to select post-processing configurations on a per-object region basis. Such an approach may be particularly useful when the bitstream includes ultra-high-resolution video that places a relatively heavy burden on the video playback hardware.

Embodiments described herein solve the region configuration (e.g., algorithm) choice problem as a combinatorial optimization problem. The main effort is to maximize aggregated quality levels from all regions given the computational resource availability to produce quality levels that are constrained. A key contribution is using the context information passed from the video source to derive the quality level of every region and make the solution practical.

For example, it may be assumed that W is the computation constraint, n is number of object regions, m is number of computation configurations available to VPP module 92. For any region, one configuration may be chosen/selected from the m candidates. In this example, $c=(c_0, \ldots, c_{m-1})$ denotes the unit computational costs of the candidate configurations. For region i, $v_i=(v_{i,0}, \ldots, v_{i,m-1})$ may denote the quality levels that the candidate configurations achieve on the region. Additionally, $x_i \in \{0, \ldots, m-1\}$ may denote the choice of the configuration for region i and $d_i$ the region size (or area dimension of the region).

The VPP module 92 may automatically determine the $x_i$ to $$\max_{x_1, \ldots, x_n} \sum_{i=0}^{n-1} v_{i,x_i},$$

subject to $$\sum_{i=0}^{n-1} d_i c_{x_i} \leq W$$

in which $d_i c_{x_i}$ is the computational cost for region i derived from the unit computational cost and the region size.

The function of deciding quality levels may take object region motion, focus and depth as input, and heuristically derive the quality levels that different configurations achieve on each region. Configurations have different quality impacts to different object regions. For example, lower-depth object regions might receive a higher quality level to achieve a finer post-processing, while higher-depth object regions may not (e.g., particularly, if computational resources are restricted). Similarly, the in-motion object regions may receive added value and/or a finer configuration, as well. Moreover, focused object regions may receive additional value in the determination.

In the soccer ball scene example of the video frame 54 (FIG. 2), it might be assumed that there are three configuration candidates (m=3). If Configuration 0 represents the lowest complexity (e.g., CV based video quality enhancement), Configuration 1 represents a lower complexity (e.g., scalable neural network), and Configuration 2 represents the highest complexity (scalable neural network), the quality level $v_1$ may be demonstrated as:

| | |
|---|---|
| $v_0 = (0.1, 0.8, 1)$ | Highest value mapped to highest complexity processing |
| $v_1 = (0.1, 0.8, 1)$ | Highest value mapped to highest complexity processing |
| $v_2 = (0.1, 0.5, 0.6)$ | Less added value towards higher complexity processing |
| $v_3 = (0.1, 0.5, 0.6)$ | Less added value towards higher complexity processing |
| $v_4 = (0.1, 0.2, 0.3)$ | Not much added value towards higher complexity processing |
| $v_5 = (0.1, 0.11, 0.12)$ | Little added value towards higher complexity processing |

Figure 7:
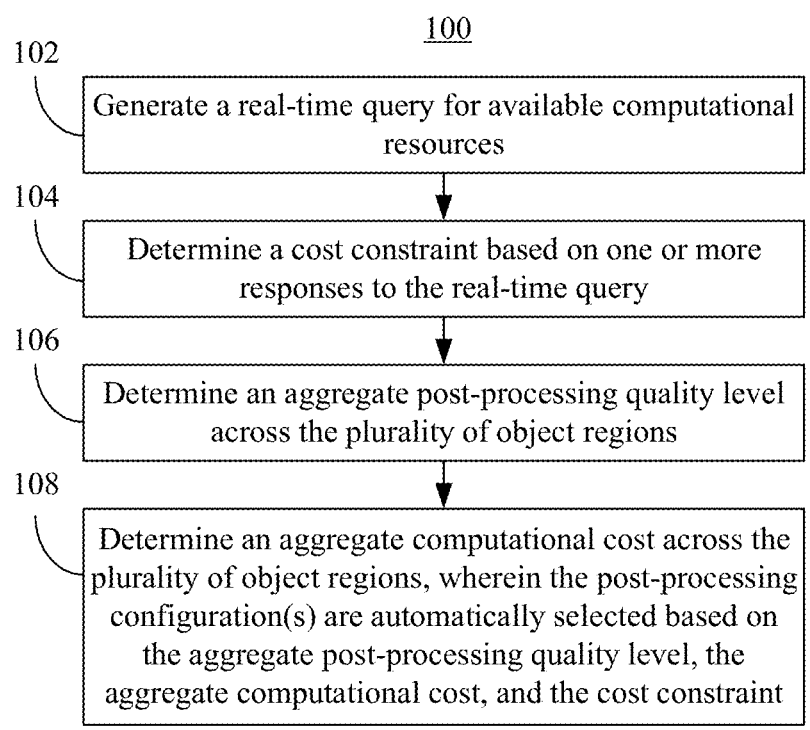
FIG. 7 is a flowchart of an example of a method of automatically selecting post-processing configurations according to an embodiment.

FIG. 7 shows a method 100 of automatically selecting post-processing configurations. The method 100 may generally be implemented in a playback device such as, for example, the playback device 22 (FIG. 1) and/or the VPP module 92 (FIG. 6), already discussed. Additionally, the method 100 may be incorporated into block 76 (FIG. 4), already discussed. More particularly, the method 100 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 102 generates a real-time query for available computational resources. A cost constraint may be determined at block 104 based on one or more responses to the real-time query. Additionally, block 106 determines an aggregate post-processing quality level across the plurality of object regions. In an embodiment, an aggregate computational cost is determined across the plurality of object regions at block 108, wherein the post-processing configuration(s) are automatically selected based on the aggregate post-processing quality level, the aggregate computational cost, and the cost constraint. Accordingly, the method 100 further enhances performance by taking into consideration the availability of computational resources when selecting post-processing configurations on a per-object region basis.

Figure 8A:
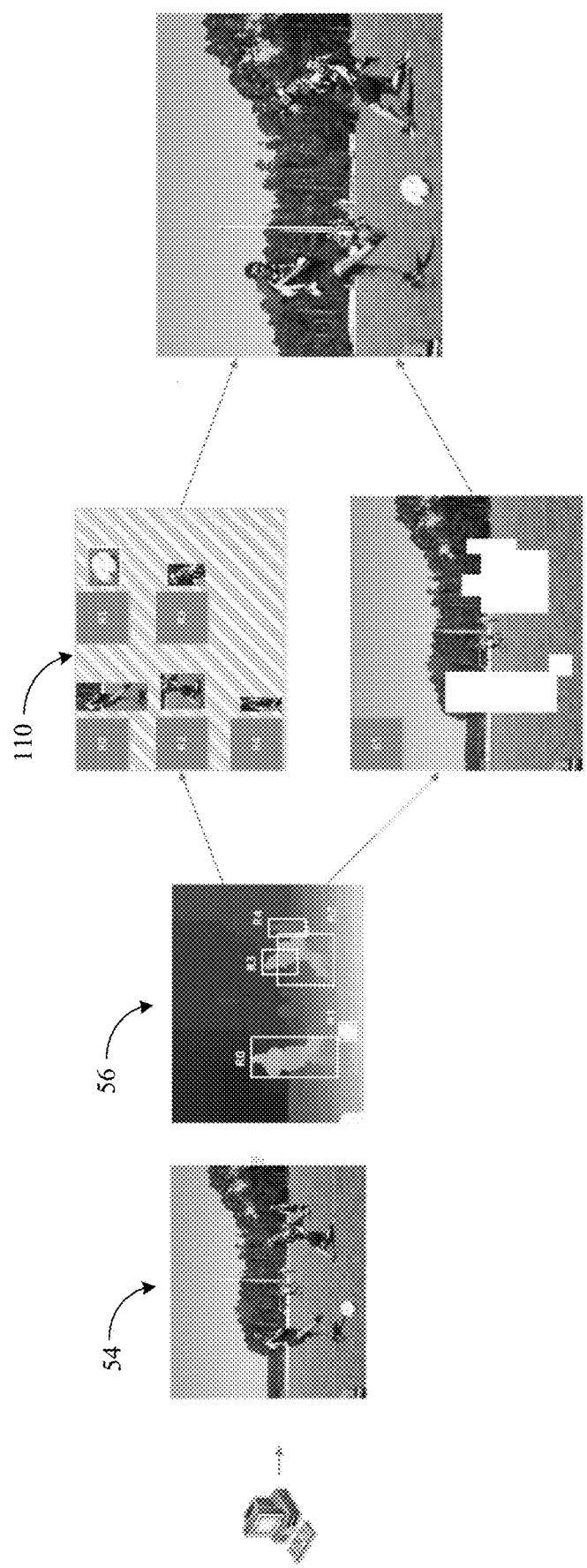
FIGS. 8A and 8B are illustrations of examples of automatic selections of post-processing configurations according to embodiments.
Figure 8B:
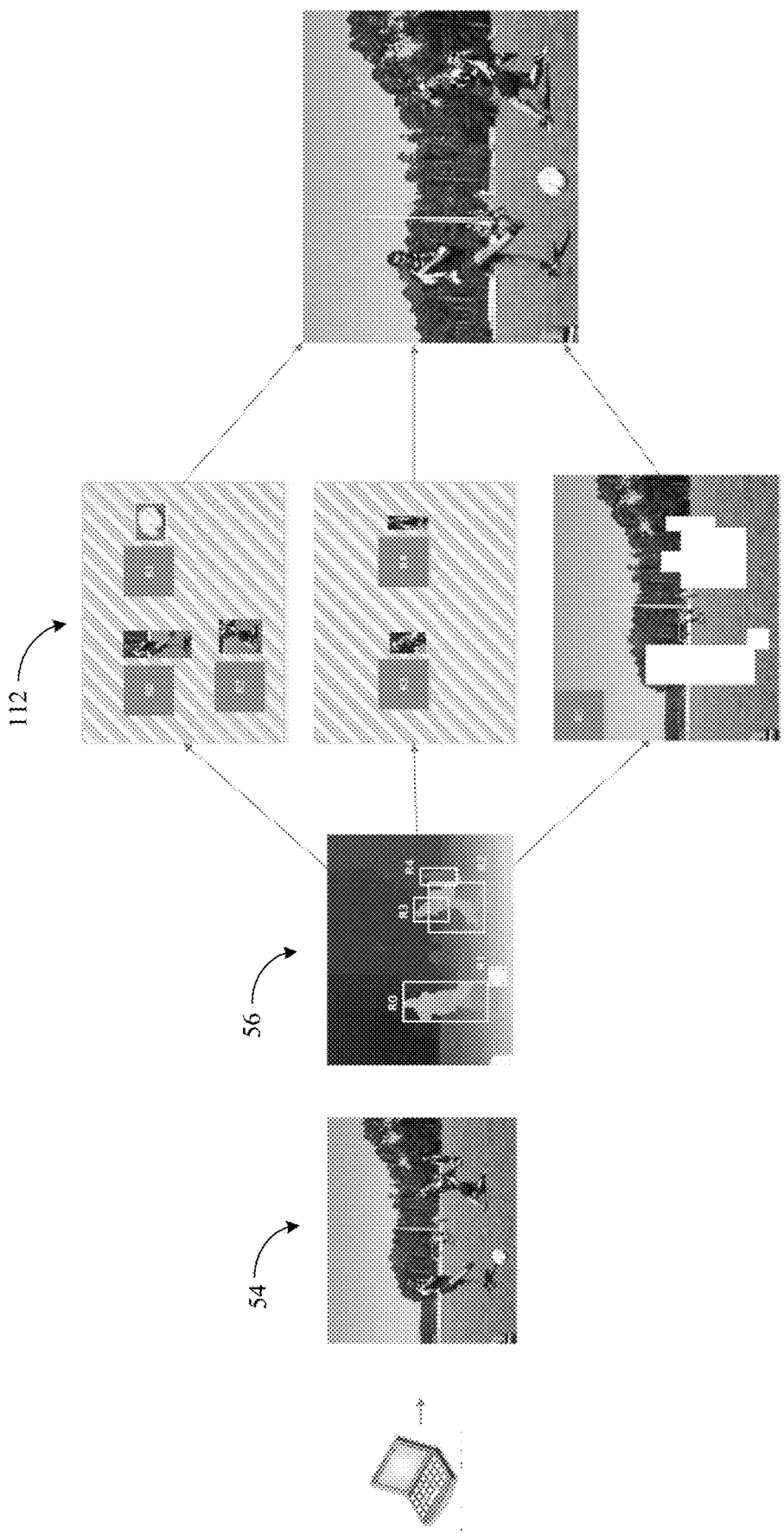

Turning now to FIGS. 8A and 8B, automatic selections of post-processing configurations are shown for 1) a platform with sufficient computational resources, and 2) a platform without sufficient computational resources, respectively.

Assuming that the region dimensions in the scene are 10, 1, 10, 6,4,30 each, three configurations might have respective computational unit costs of c=(1, 3,9). Based on the quality levels previously described, given the computation constraints W in different end device situations:

As shown in a first result 110 of FIG. 8A, W=500 is sufficient for every region to select highest complexity processing algorithm, i.e., $$x=(x_0, x_1, \ldots, x_5)=(2,2,2,2,2,2)$$

As shown in a second result 112 of FIG. 8B, a low-end playback device introduces the constraint W=250, which will result in the below selection:

$$x=(2,2,2,1,1,0), V_{max}=1+1+0.6+0.5+0.2+0.1=3.4, \text{sum of weight}=10*9+1*9+10*9+6*3+4*3+1*30=249<=W$$

Other mappings either cannot maximize the value, or, they exceed the W constraints, such as:

if $x=(2,2,2,2,1,0), V=1+1+0.6+0.6+0.2+0.1=3.5$, sum of weight=9*10+9*1+9*10+9*6+3*4+1*30=285>W(overweighted)

if $x=(2,2,0,1,1,1), V=2.91$, sum of weight=229<W (value *not* maximized)

Figure 9:
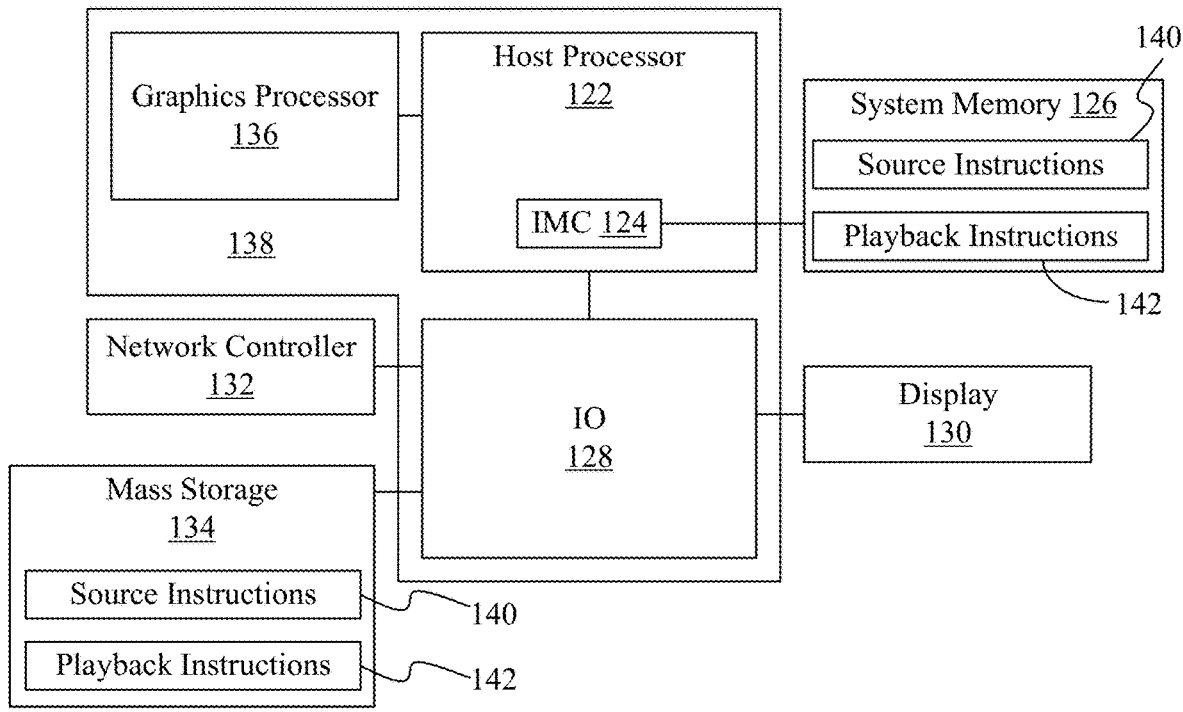
FIG. 9 is a block diagram of an example of a performance-enhanced computing system according to an embodiment.

Turning now to FIG. 9, a performance-enhanced computing system 120 is shown. The system 120 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof.

In the illustrated example, the system 120 includes a host processor 122 (e.g., CPU) having an integrated memory controller (IMC) 124 that is coupled to a system memory 126. In an embodiment, an IO module 128 is coupled to the host processor 122. The illustrated IO module 128 communicates with, for example, a display 130 (e.g., touch screen, liquid crystal display/LCD, light emitting diode/LED display), a network controller 132 (e.g., wired and/or wireless), and a mass storage 134 (e.g., hard disk drive/HDD, optical disc, solid-state drive/SSD, flash memory, etc.). The host processor 122 may be combined with the IO module 128 and a graphics processor 136 (e.g., GPU) into a system on chip (SoC) 138.

In an embodiment, the computing system 120 operates as a source device. In such a case, the host processor 122, the IO module 128 and/or the graphics processor 136 executes a set of executable source instructions 140 retrieved from the system memory 126 and/or the mass storage 134 to perform one or more aspects of the method 60 (FIG. 3), already discussed. Thus, execution of the source instructions 140 may cause the computing system 120 to identify a plurality of object regions in a video frame, automatically generate context information for the video frame on a per-object region basis, embed the context information in a signal containing the video frame, and send the signal a playback device via the network controller 132. The illustrated computing system 120 is therefore considered to be performance-enhanced as a source device at least to the extent that structuring the context information on the per-object region basis provides greater flexibility and efficiency in the source device.

In another embodiment, the computing system 120 operates as a playback device. In such a case, the host processor 122, the IO module 128 and/or the graphics processor 136 executes a set of executable playback instructions 142 retrieved from the system memory 126 and/or the mass storage 134 to perform one or more aspects of the method 70 (FIG. 4) and/or the method 100 (FIG. 7), already discussed. Thus, execution of the playback instructions 142 may cause the computing system 120 to receive a signal via the network controller 132, wherein the signal contains a video frame and embedded context information, decode the signal, identify a plurality of object regions in the video frame based on the embedded context information, and automatically select one or more post-processing configurations for the video frame on a per-object region basis. The illustrated computing system 120 is therefore considered to be performance-enhanced as a playback device at least to the extent that the automated selection of VPP configurations on a per-object region basis improves flexibility, reduces power consumption, and increases efficiency in the playback device.

Figure 10:
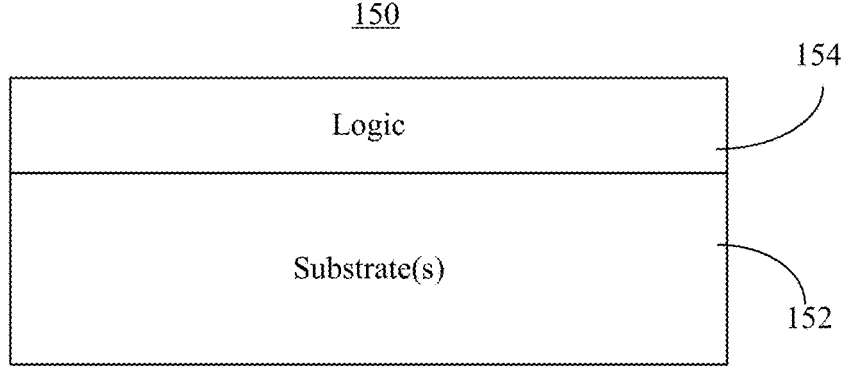
FIG. 10 is an illustration of an example of a semiconductor package apparatus according to an embodiment.

FIG. 10 shows a semiconductor apparatus 150 (e.g., chip, die, package). The illustrated apparatus 150 includes one or more substrates 152 (e.g., silicon, sapphire, gallium arsenide) and logic 154 (e.g., transistor array and other integrated circuit/IC components) coupled to the substrate(s) 152. In an embodiment, the logic 154 implements one or more aspects of the method 60 (FIG. 3), the method 70 (FIG. 4) and/or the method 100 (FIG. 7), already discussed. Thus, the logic 154 may enhance performance in a source device by identifying a plurality of object regions in a video frame, automatically generating context information for the video frame on a per-object region basis, and embedding the context information in a signal containing the video frame. The logic 154 may also enhance performance in a playback device by decoding a signal containing a video frame and embedded context information, identifying a plurality of object regions in the video frame based on the embedded context information, an automatically selecting one or more post-processing configurations for the video frame on a per-object region basis.

The logic 154 may be implemented at least partly in configurable logic or fixed-functionality hardware logic. In one example, the logic 154 includes transistor channel regions that are positioned (e.g., embedded) within the substrate(s) 152. Thus, the interface between the logic 154 and the substrate(s) 152 may not be an abrupt junction. The logic 154 may also be considered to include an epitaxial layer that is grown on an initial wafer of the substrate(s) 152.

Figure 11:
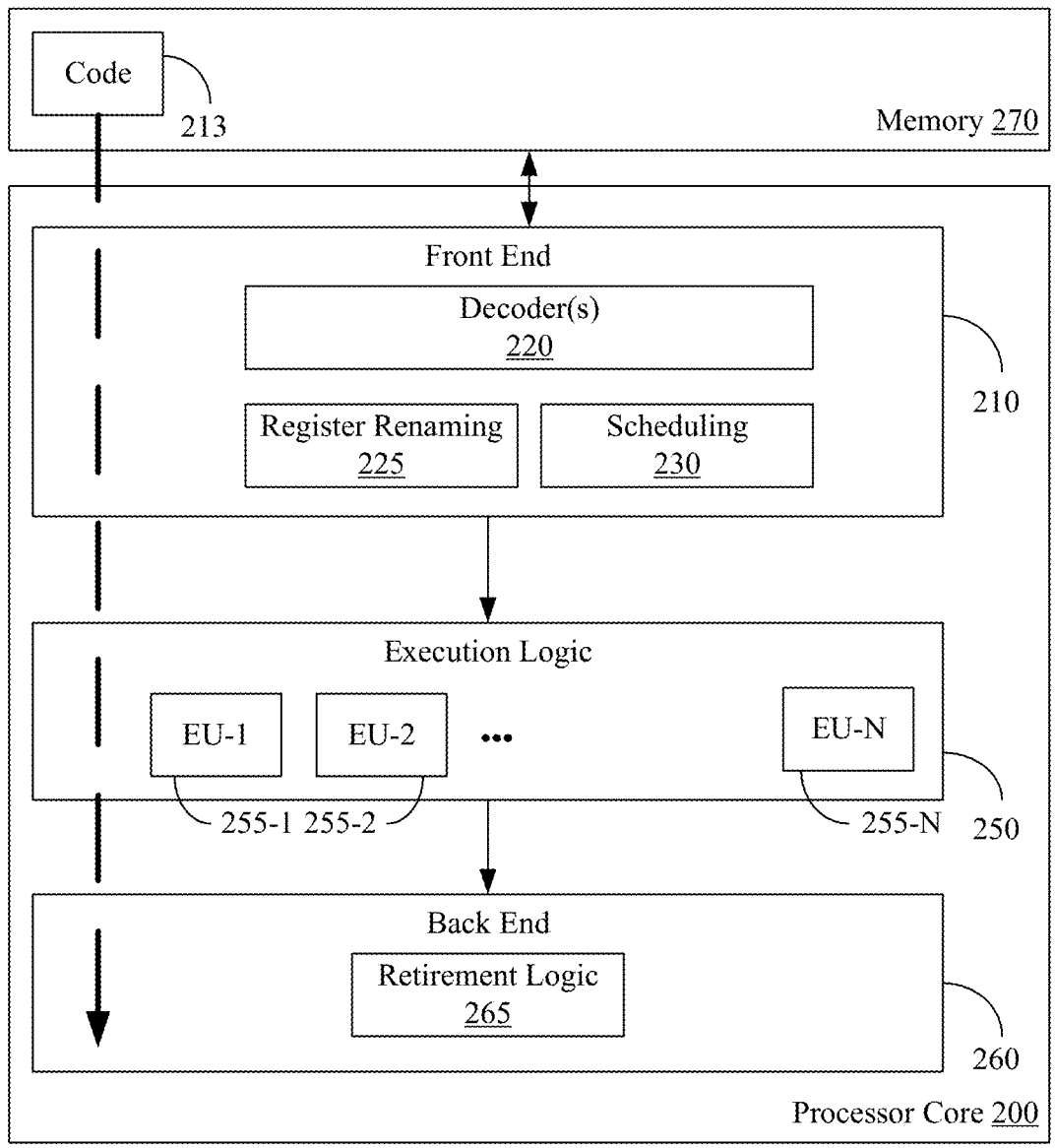
FIG. 11 is a block diagram of an example of a processor according to an embodiment.

FIG. 11 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 11, a processing element may alternatively include more than one of the processor core 200 illustrated in FIG. 11. The processor core 200 may be a single-threaded core or, for at least one embodiment, the processor core 200 may be multithreaded in that it may include more than one hardware thread context (or "logical processor") per core.

FIG. 11 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 60 (FIG. 3), the method 70 (FIG. 4) and/or the method 100 (FIG. 7), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 11, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 12:
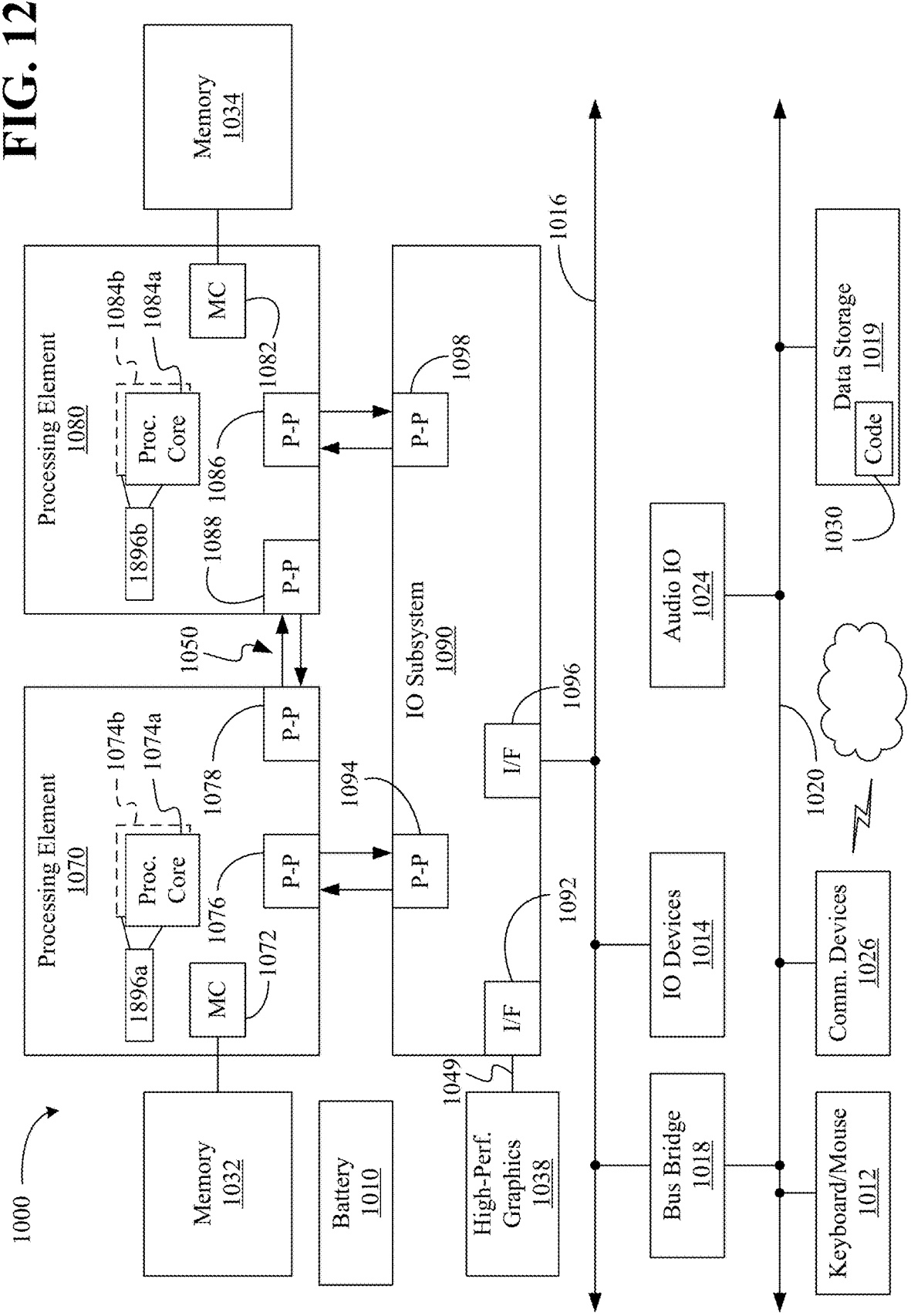
FIG. 12 is a block diagram of an example of a multi-processor based computing system according to an embodiment.

Referring now to FIG. 12, shown is a block diagram of a computing system 1000 embodiment in accordance with an embodiment. Shown in FIG. 12 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 12 may be implemented as a multi-drop bus rather than point-to-point interconnect.

As shown in FIG. 12, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 11.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 12, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 12, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 12, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 60 (FIG. 3), the method 70 (FIG. 4) and/or the method 100 (FIG. 7), already discussed, and may be similar to the code 213 (FIG. 11), already discussed. Further, an audio I/O 1024 may be coupled to second bus 1020 and a battery 1010 may supply power to the computing system 1000.

Note that other embodiments are contemplated. For example, instead of the point-to-point architecture of FIG. 12, a system may implement a multi-drop bus or another such communication topology. Also, the elements of FIG. 12 may alternatively be partitioned using more or fewer integrated chips than shown in FIG. 12.

ADDITIONAL NOTES AND EXAMPLES

Example 1 includes a source semiconductor apparatus comprising one or more substrates and logic coupled to the one or more substrates, wherein the logic is implemented at least partly in one or more of configurable logic or fixed-functionality hardware logic, the logic coupled to the one or more substrates to identify a plurality of object regions in a video frame, automatically generate context information for the video frame on a per-object region basis, and embed the context information in a signal containing the video frame.

Example 2 includes the apparatus of Example 1, wherein the context information includes a plurality of object region identifiers and one or more of focus information, depth information or motion vector information on the per-object region basis.

Example 3 includes the apparatus of Example 1, wherein the logic coupled to the one or more substrates is to obtain the video frame from a video capture component.

Example 4 includes the apparatus of Example 1, wherein the logic coupled to the one or more substrates is to obtain the video frame from a graphics rendering component.

Example 5 includes the apparatus of any one of Examples 1 to 3, wherein the logic coupled to the one or more substrates includes transistor channel regions that are positioned within the one or more substrates.

Example 6 includes at least one computer readable storage medium comprising a set of executable source instructions, which when executed by a computing system, cause the computing system to identify a plurality of object regions in a video frame, automatically generate context information for the video frame on a per-object region basis, and embed the context information in a signal containing the video frame.

Example 7 includes the at least one computer readable storage medium of Example 6, wherein the context information is to include a plurality of object region identifiers and one or more of focus information, depth information or motion vector information on the per-object region basis.

Example 8 includes the at least one computer readable storage medium of Example 6, wherein the instructions, when executed, further cause the computing system to obtain the video frame from a video capture component.

Example 9 includes the at least one computer readable storage medium of Example 6, wherein the instructions, when executed, further cause the computing system to obtain the video frame from a graphics rendering component.

Example 10 includes the at least one computer readable storage medium of any one of Examples 6 to 9, wherein the context information is embedded in the signal as a supplemental enhancement information message.

Example 11 includes a playback semiconductor apparatus comprising one or more substrates, and logic coupled to the one or more substrates, wherein the logic is implemented at least partly in one or more of configurable logic or fixed-functionality hardware logic, the logic coupled to the one or more substrates to decode a signal containing a video frame and embedded context information, identify a plurality of object regions in the video frame based on the embedded context information, and automatically select one or more post-processing configurations for the video frame on a per-object region basis.

Example 12 includes the apparatus of Example 11, wherein the embedded context information includes a plurality of object region identifiers and one or more of focus information, depth information or motion vector information on the per-object region basis.

Example 13 includes the apparatus of Example 11, wherein the logic coupled to the one or more substrates is to determine an aggregate post-processing quality level across the plurality of object regions, and determine an aggregate computational cost across the plurality of object regions, wherein the one or more post-processing configurations are automatically selected based on the aggregate post-processing quality level, the aggregate computational cost, and a cost constraint.

Example 14 includes the apparatus of Example 13, wherein the logic coupled to the one or more substrates is to generate a real-time query for available computational resources, and determine the cost constraint based on one or more responses to the real-time query.

Example 15 includes the apparatus of Example 11, wherein to automatically select the one or more post-processing configurations, the logic coupled to the one or more substrates is to select between one or more neural network configurations and one or more video enhancement processes.

Example 16 includes the apparatus of Example 11, wherein to automatically select the one or more post-processing configurations, the logic coupled to the one or more substrates is to automatically select a first post-processing configuration for a first object region in the video frame, automatically select a second post-processing configuration for a second object region in the video frame, and automatically select a third post-processing configuration for a third object region in the video frame, wherein the first post-processing configuration, the second post-processing configuration, and the third post-processing configuration are to be different from one another.

Example 17 includes the apparatus of any one of Examples 11 to 16, wherein the logic coupled to the one or more substrates is to apply the automatically selected one or more post-processing configurations to the video frame to obtain an output, and wherein the automatically selected one or more post-processing configurations one or more of reduce visual noise in the output, reduce audible noise in the output, remove compression artifacts from the output, enhance contrast in the output, enhance sharpness in the output or scale the output.

Example 18 includes the apparatus of any one of Examples 11 to 16, wherein the logic coupled to the one or more substrates includes transistor channel regions that are positioned within the one or more substrates.

Example 19 includes at least one computer readable storage medium comprising a set of executable playback instructions, which when executed by a computing system, cause the computing system to decode a signal containing a video frame and embedded context information, identify a plurality of object regions in the video frame based on the embedded context information, and automatically select one or more post-processing configurations for the video frame on a per-object region basis.

Example 20 includes the at least one computer readable storage medium of Example 19, wherein the embedded context information includes a plurality of object region identifiers and one or more of focus information, depth information or motion vector information on the per-object region basis.

Example 21 includes the at least one computer readable storage medium of Example 19, wherein the playback instructions, when executed, further cause the computing system to determine an aggregate post-processing quality level across the plurality of object regions, and determine an aggregate computational cost across the plurality of object regions, wherein the one or more post-processing configurations are automatically selected based on the aggregate post-processing quality level, the aggregate computational cost, and a cost constraint.

Example 22 includes the at least one computer readable storage medium of Example 21, wherein the playback instructions, when executed, further cause the computing system to generate a real-time query for available computational resources, and determine the cost constraint based on one or more responses to the real-time query.

Example 23 includes the at least one computer readable storage medium of Example 19, wherein to automatically select the one or more post-processing configurations, the playback instructions, when executed, are to select between one or more neural network configurations and one or more video enhancement processes.

Example 24 includes the at least one computer readable storage medium 19, wherein to automatically select the one or more post-processing configurations, the playback instructions, when executed, cause the computing system to automatically select a first post-processing configuration for a first object region in the video frame, automatically select a second post-processing configuration for a second object region in the video frame, and automatically select a third post-processing configuration for a third object region in the video frame, wherein the first post-processing configuration, the second post-processing configuration, and the third post-processing configuration are to be different from one another.

Example 25 includes the at least one computer-readable storage medium of any one of Examples 19 to 24, wherein the playback instructions, when executed, further cause the computing system to apply the automatically selected one or more post-processing configurations to the video frame to obtain an output, and wherein the automatically selected one or more post-processing configurations one or more of reduce visual noise in the output, reduce audible noise in the output, remove compression artifacts from the output, enhance contrast in the output, enhance sharpness in the output or scale the output.

Example 26 includes a method of operating a source device, the method comprising identifying a plurality of object regions in a video frame, automatically generating context information for the video frame on a per-object region basis, and embedding the context information in a signal containing the video frame.

Example 27 includes the method of Example 26, wherein the context information includes a plurality of object region identifiers and one or more of focus information, depth information or motion vector information on the per-object region basis.

Example 28 includes the method of Example 26, further including obtaining the video frame from a video capture component.

Example 29 includes the method of Example 26, further including obtaining the video frame from a graphics rendering component.

Example 30 includes the method of any one of Examples 26 to 29, wherein the context information is embedded in the signal as a supplemental enhancement information message.

Example 31 includes a source device comprising a network controller, a processor, and a memory including a set of executable source instructions, which when executed by the processor, cause the processor to perform the method of any one of Examples 26 to 30.

Example 32 includes means for performing the method of any one of Examples 26 to 30.

Example 33 includes a method of operating a playback device, the method comprising decoding a signal containing a video frame and embedded context information, identifying a plurality of object regions in the video frame based on the embedded context information, and automatically selecting one or more post-processing configurations for the video frame on a per-object region basis.

Example 34 includes the method of Example 33, wherein the embedded context information includes a plurality of object region identifiers and one or more of focus information, depth information or motion vector information on the per-object region basis.

Example 35 includes the method of Example 33, further including determining an aggregate post-processing quality level across the plurality of object regions and determining an aggregate computational cost across the plurality of object regions, wherein the one or more post-processing configurations are automatically selected based on the aggregate post-processing quality level, the aggregate computational cost, and a cost constraint.

Example 36 includes the method of Example 35, further including generating a real-time query for available computational resources and determining the cost constraint based on one or more responses to the real-time query.

Example 37 includes the method of Example 33, wherein automatically selecting the one or more post-processing configurations includes selecting between one or more neural network configurations and one or more video enhancement processes.

Example 38 includes the method of Example 33, wherein automatically selecting the one or more post-processing configurations includes automatically selecting a first post-processing configuration for a first object region in the video frame, automatically selecting a second post-processing configuration for a second object region in the video frame, and automatically selecting a third post-processing configuration for a third object region in the video frame, wherein the first post-processing configuration, the second post-processing configuration, and the third post-processing configuration are to be different from one another.

Example 39 includes the method of any one of Examples 33 to 38, further including applying the automatically selected one or more post-processing configurations to the video frame to obtain an output, wherein the automatically selected one or more post-processing configurations one or more of reduce visual noise in the output, reduce audible noise in the output, remove compression artifacts from the output, enhance contrast in the output, enhance sharpness in the output or scale the output.

Example 40 includes a playback device comprising a network controller, a processor, and a memory including a set of executable playback instructions, which when executed by the processor, cause the processor to perform the method of any one of Examples 33 to 39.

Example 41 includes means for performing the method of any one of Examples 33 to 39.

Thus, technology described herein may support the rendering of ultra-high-resolution video frames (e.g., 4 k/8K) on resource limited hardware, while maintaining an excellent user experience. Moreover, a flexible strategy may be used at the video post-processing stage according to available dynamic computing resources on high-end and low-end hardware device. Accordingly, less computation complexity and power consumption may be achieved. The technology introduces no overhead bits in video encoding.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A source semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
identify a plurality of object regions in a video frame;
automatically generate context information for the video frame on a per-object region basis; and
embed the context information in a signal containing the video frame, wherein the context information includes a plurality of object region identifiers and one or more of focus information or depth information on the per-object region basis.

2. The apparatus of claim 1, wherein the context information includes a plurality of object region identifiers and the focus information, the depth information and motion vector information on the per-object region basis.

3. The apparatus of claim 1, wherein the logic coupled to the one or more substrates is to obtain the video frame from a video capture component.

4. The apparatus of claim 1, wherein the logic coupled to the one or more substrates is to obtain the video frame from a graphics rendering component.

5. The apparatus of claim 1, wherein the logic coupled to the one or more substrates includes transistor channel regions that are positioned within the one or more substrates.

6. At least one non-transitory computer readable storage medium comprising a set of executable source instructions, which when executed by a computing system, cause the computing system to:
identify a plurality of object regions in a video frame;
automatically generate context information for the video frame on a per-object region basis; and
embed the context information in a signal containing the video frame, wherein the context information includes a plurality of object region identifiers and one or more of focus information or depth information on the per-object region basis.

7. The at least one non-transitory computer readable storage medium of claim 6, wherein the context information is to include a plurality of object region identifiers and the focus information, the depth information and motion vector information on the per-object region basis.

8. The at least one non-transitory computer readable storage medium of claim 6, wherein the instructions, when executed, further cause the computing system to obtain the video frame from a video capture component.

9. The at least one non-transitory computer readable storage medium of claim 6, wherein the instructions, when executed, further cause the computing system to obtain the video frame from a graphics rendering component.

10. The at least one non-transitory computer readable storage medium of claim 6, wherein the context information is embedded in the signal as a supplemental enhancement information message.

11. A playback semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
decode a signal containing a video frame and embedded context information;
identify a plurality of object regions in the video frame based on the embedded context information; and
automatically select one or more post-processing configurations for the video frame on a per-object region basis, wherein the one or more post-processing configurations are selected based on an aggregate post-processing quality level and an aggregate computational cost.

12. The apparatus of claim 11, wherein the embedded context information includes a plurality of object region identifiers and one or more of focus information, depth information or motion vector information on the per-object region basis.

13. The apparatus of claim 11, wherein the logic coupled to the one or more substrates is to:
determine the aggregate post-processing quality level across the plurality of object regions; and
determine the aggregate computational cost across the plurality of object regions, wherein the one or more post-processing configurations are automatically selected based on a cost constraint.

14. The apparatus of claim 13, wherein the logic coupled to the one or more substrates is to:
generate a real-time query for available computational resources; and
determine the cost constraint based on one or more responses to the real-time query.

15. The apparatus of claim 11, wherein to automatically select the one or more post-processing configurations, the logic coupled to the one or more substrates is to select between one or more neural network configurations and one or more video enhancement processes.

16. The apparatus of claim 11, wherein to automatically select the one or more post-processing configurations, the logic coupled to the one or more substrates is to:
automatically select a first post-processing configuration for a first object region in the video frame;
automatically select a second post-processing configuration for a second object region in the video frame; and
automatically select a third post-processing configuration for a third object region in the video frame, wherein the first post-processing configuration, the second post-processing configuration, and the third post-processing configuration are to be different from one another.

17. The apparatus of claim 11, wherein the logic coupled to the one or more substrates is to apply the automatically selected one or more post-processing configurations to the video frame to obtain an output, and wherein the automatically selected one or more post-processing configurations one or more of reduce visual noise in the output, reduce audible noise in the output, remove compression artifacts from the output, enhance contrast in the output, enhance sharpness in the output or scale the output.

18. The apparatus of claim 11, wherein the logic coupled to the one or more substrates includes transistor channel regions that are positioned within the one or more substrates.

19. At least one non-transitory computer readable storage medium comprising a set of executable playback instructions, which when executed by a computing system, cause the computing system to:
    decode a signal containing a video frame and embedded context information;
    identify a plurality of object regions in the video frame based on the embedded context information; and
    automatically select one or more post-processing configurations for the video frame on a per-object region basis, wherein the one or more post-processing configurations are selected based on an aggregate post-processing quality level and an aggregate computational cost.

20. The at least one non-transitory computer readable storage medium of claim 19, wherein the embedded context information includes a plurality of object region identifiers and one or more of focus information, depth information or motion vector information on the per-object region basis.

21. The at least one non-transitory computer readable storage medium of claim 19, wherein the playback instructions, when executed, further cause the computing system to:
    determine the aggregate post-processing quality level across the plurality of object regions; and
    determine the aggregate computational cost across the plurality of object regions, wherein the one or more post-processing configurations are automatically selected based on a cost constraint.

22. The at least one non-transitory computer readable storage medium of claim 21, wherein the playback instructions, when executed, further cause the computing system to:
    generate a real-time query for available computational resources; and
    determine the cost constraint based on one or more responses to the real-time query.

23. The at least one non-transitory computer readable storage medium of claim 19, wherein to automatically select the one or more post-processing configurations, the playback instructions, when executed, are to select between one or more neural network configurations and one or more video enhancement processes.

24. The at least one non-transitory computer readable storage medium 19, wherein to automatically select the one or more post-processing configurations, the playback instructions, when executed, cause the computing system to:
    automatically select a first post-processing configuration for a first object region in the video frame;
    automatically select a second post-processing configuration for a second object region in the video frame; and
    automatically select a third post-processing configuration for a third object region in the video frame, wherein the first post-processing configuration, the second post-processing configuration, and the third post-processing configuration are to be different from one another.

25. The at least one non-transitory computer-readable storage medium of claim 19, wherein the playback instructions, when executed, further cause the computing system to apply the automatically selected one or more post-processing configurations to the video frame to obtain an output, and wherein the automatically selected one or more post-processing configurations one or more of reduce visual noise in the output, reduce audible noise in the output, remove compression artifacts from the output, enhance contrast in the output, enhance sharpness in the output or scale the output.

* * * * *